J. G. Oonk,
Show Stand.
N° 71,047. Patented Nov. 19, 1867.
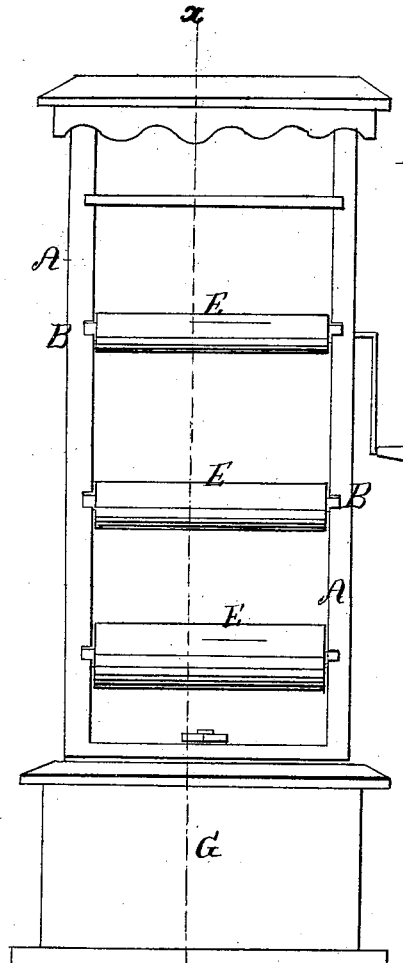
Fig: 1.
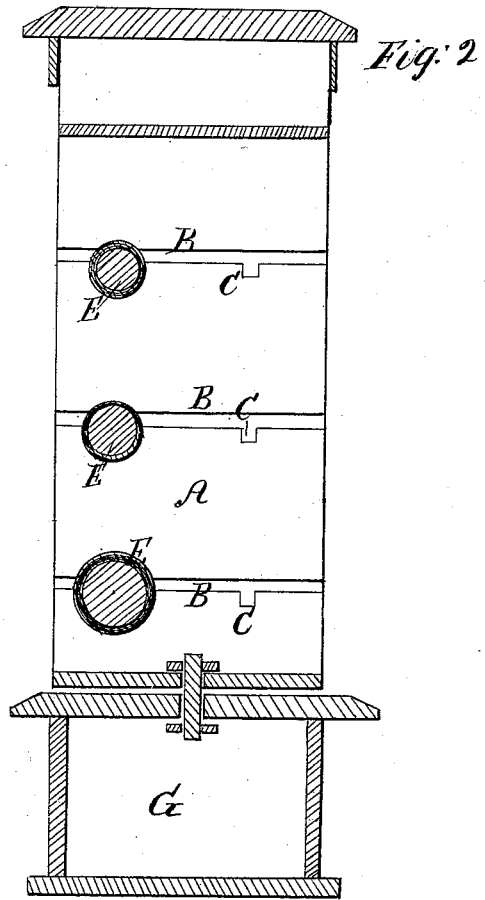
Fig: 2.
Witnesses:
Theo. Fusché
Wm. Trevis
Inventor;
J. G. Oonk
Per Munn & Co
Attorneys

United States Patent Office.

JOHN G. OONK, OF OWENSVILLE, OHIO.

Letters Patent No. 71,047, dated November 19, 1867.

---

SHOW-STAND.

---

The Schedule referred to in these Letters Patent and making part of the same.

---

TO ALL WHOM IT MAY CONCERN:

Be it known that I, JOHN G. OONK, of Owensville, in the county of Clermont, and State of Ohio, have invented a new and improved Show-Stand; and I do hereby declare that the following is a full, clear, and exact description thereof, which will enable others skilled in the art to make and use the same, reference being had to the accompanying drawings, forming part of this specification.

The present invention relates to an improved stand for the storing and showing of goods, etc., in stores, which consists in providing the stand or closet with a series of rollers, in which the goods are wound, and from which they can be unwound for being shown, etc. In the accompanying plate of drawings my improved show-stand is illustrated—

Figure 1 being a front elevation of the same, and

Figure 2 a transverse vertical section taken in the plane of the line $x\,x$, fig. 1.

Similar letters of reference indicate corresponding parts.

A, in the drawings, represents the stand or closet, having a series of grooves, B, for securing shelves. These grooves are notched at points C to form bearings for the journals D to a roller or drum, E, around which the goods are to be wound, and for being kept and unwound for being shown or exhibited. F, a crank-handle for the turning of the rollers, which crank is susceptible of being attached and detached from one or the other of the series of rollers. The show-stand is arranged upon a pedestal, C, so as to be swung around thereon.

I claim as new, and desire to secure by Letters Patent—

A show-stand constructed substantially as and for the purpose described.

JOHN G. OONK.

Witnesses:
A. O. SMITH,
JAMES PATTISON.